United States Patent Office.

JOHN C. MARSHALL, OF OAKLAND, CALIFORNIA, ASSIGNOR OF TWO-THIRDS TO LUCIEN B. JEWELL AND WILLIAM B. FREDERICK, BOTH OF SAME PLACE.

WOOD-PRESERVING COMPOSITION.

SPECIFICATION forming part of Letters Patent No. 259,030, dated June 6, 1882.

Application filed September 8, 1881. (No specimens.)

*To all whom it may concern:*

Be it known that I, JOHN C. MARSHALL, of Oakland, county of Alameda, State of California, have invented a new and useful Wood-Preserving Composition; and I hereby declare the following to be a full, clear, and exact description thereof.

My composition consists of the following ingredients: linseed-oil, about one gallon; chloride of sodium, (salt,) about four ounces; saltpeter, about two ounces; turpentine, about one pint.

The manner of preparing the compound is as follows: First mix as much of the chloride of sodium (common salt) and of the saltpeter into the linseed-oil as the oil will hold in suspension. If the oil used be thick, add sufficient turpentine to reduce its consistency as desired. Then heat all together to a degree a little below the boiling-point. Care must be taken that the compound should not boil.

In using the above-named composition the wood may either be immersed therein or the compound may be applied with a brush when found more convenient. The compound should be applied while hot to the wood. Take, for example, a wheel the tire of which has become loose. It should be raised suitably and allowed to revolve so that its tire and felly will be immersed in the hot compound, which will penetrate between the wood, and the tire will fit as tightly as before. If applied to the felly when the tire is first put on, the wood will be prevented from shrinking.

This compound is useful for buckets or casks which are to stand in the sun or have so been exposed for any length of time. Its previous application will prevent the shrinking or warping of the staves, or its subsequent use will take up the shrinkage and make them tight again. In all cases where wood is liable to shrink or warp this application is useful in preventing this result or in remedying it if it has happened. It is also a good preservative for wood, as it will prevent decay.

Although I have stated the addition of turpentine above, I do not confine myself to its use in every case. The turpentine and its quantity depend upon the quality of the linseed-oil. If the latter be thicker than usual, more turpentine will be required to thin it than if it be already thin; or it may be that, being of a very fine quality, no turpentine at all will be needed.

Having thus described my invention, what I claim as new, and desire to secure by Letters Patent, is—

A composition for treating wood, consisting of linseed-oil, common salt, saltpeter, and turpentine, mixed in about the proportions set forth.

In witness whereof I have hereunto set my hand.

JOHN C. MARSHALL.

Witnesses:
W. L. PRATHER,
J. W. CUTHBERT.